(12) United States Patent
Scott et al.

(10) Patent No.: US 6,226,976 B1
(45) Date of Patent: *May 8, 2001

(54) VARIABLE FUEL HEATING VALUE ADAPTIVE CONTROL FOR GAS TURBINE ENGINES

(75) Inventors: Michael W. Scott, Chandler, AZ (US); Jeffrey S. Zimmerman, Beaconsfield (CA)

(73) Assignee: AlliedSignal, Inc., Morris Township, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,877

(22) Filed: Jun. 2, 1999

Related U.S. Application Data
(60) Provisional application No. 60/121,915, filed on Feb. 26, 1999.

(51) Int. Cl.$^7$ ........................................................ F02C 9/00
(52) U.S. Cl. ................... 60/39.03; 60/39.281; 60/39.463
(58) Field of Search ............................... 60/39.03, 39.281, 60/39.463, 39.734, 39.736, 39.091, 39.465

(56) References Cited

U.S. PATENT DOCUMENTS

| | | |
|---|---|---|
| 4,472,936 | 9/1984 | Uchiyama et al. . |
| 5,555,719 | 9/1996 | Rowen et al. . |
| 6,082,092 | 7/2000 | Vandervort . |

FOREIGN PATENT DOCUMENTS

| | | |
|---|---|---|
| 56207062 | 7/1983 | (EP) . |
| 59160227 | 2/1986 | (EP) . |

Primary Examiner—Timothy S. Thorpe
Assistant Examiner—Eric D. Hayes
(74) Attorney, Agent, or Firm—Robert Desmond, Esq.

(57) ABSTRACT

A control and method is provided that continuously adjusts fuel sensitive schedules in the ECU for changes in the heating value of the fuel being combusted by the engine. The control and method includes calculating, as the engine is running, an expected fuel flow for a baseline fuel type and an actual fuel flow. A ratio of these two fuel flows is determined and applied to the heating value of a baseline fuel type that is preprogrammed into the ECU. This results in a scale factor that is then applied to fuel sensitive schedules in the ECU.

19 Claims, 2 Drawing Sheets

VARIABLE FUEL HEATING VALUE ADAPTIVE CONTROL FOR GAS TURBINE ENGINES

CROSS REFERENCE TO RELATED APPLICATION

Priority is claimed to provisional application Ser. No. 60/121,915, filed Feb. 26, 1999.

TECHNICAL FIELD

This invention relates generally to gas turbine engine controls, and in particular to fuel control systems and methods for gas turbine engines.

BACKGROUND OF THE INVENTION

The operation of gas turbine engines, whether used on the ground for power generation or in flight for propulsion or secondary power, is controlled by an electronic control unit commonly referred to as an ECU. Incorporated in the ECU are control schedules and control logic for the engine. For example, LaCroix, U.S. Pat. No. 4,337,615 discloses a start control logic that is embodied in the engine's ECU. This start control logic, like other control logic in the ECU, is related to fuel flow to the engine and includes calculating the temperature rise in the combustor of the engine. To determine this temperature rise, the ECU must know the heating value of the fuel with the fuel's lower heating value commonly used. Thus, these types of engine controls are developed on the assumption that the lower heating value of the fuel is known and will remain constant during the life of the engine.

Some gas turbine engines are used as pollution control devices. Such devices are disclosed in Dodge et al, U.S. Pat. No. 5,592,811 and Maese et al, U.S. Pat. No. 5,673,553 in which volatile organic compounds, (VOCs), are burned and destroyed in the combustor. A problem that has arisen with the use of gas turbine engines in this manner, is that the in these applications the constituents of the gas or fuel being burned in the combustor can vary greatly resulting in a large variation in the lower heating value of the fuel. Sometimes the heating values can vary as much as fifty percent. It has been observed that large variations in lower heating value change the performance of the engine and can cause the engine to over speed or under speed at its normal operating condition.

Accordingly, there is a need for an engine control system and method that adjusts for changes in the lower heating value of the fuel.

SUMMARY OF THE INVENTION

An object of the present invention is to provide a control and method that adjusts fuel sensitive schedules in the ECU of a gas turbine engine for variations in the heating value of the fuel being combusted in the engine.

The present invention achieves this object by providing a control and method programmed into the ECU. The control and method includes the steps of calculating an expected fuel flow for a baseline fuel type and an actual fuel flow as the engine is running. A ratio of these two fuel flows is determined and applied to the heating value of a baseline fuel type, which is preprogrammed into the ECU. This results in a scale factor that is then applied to fuel sensitive schedules in the ECU.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
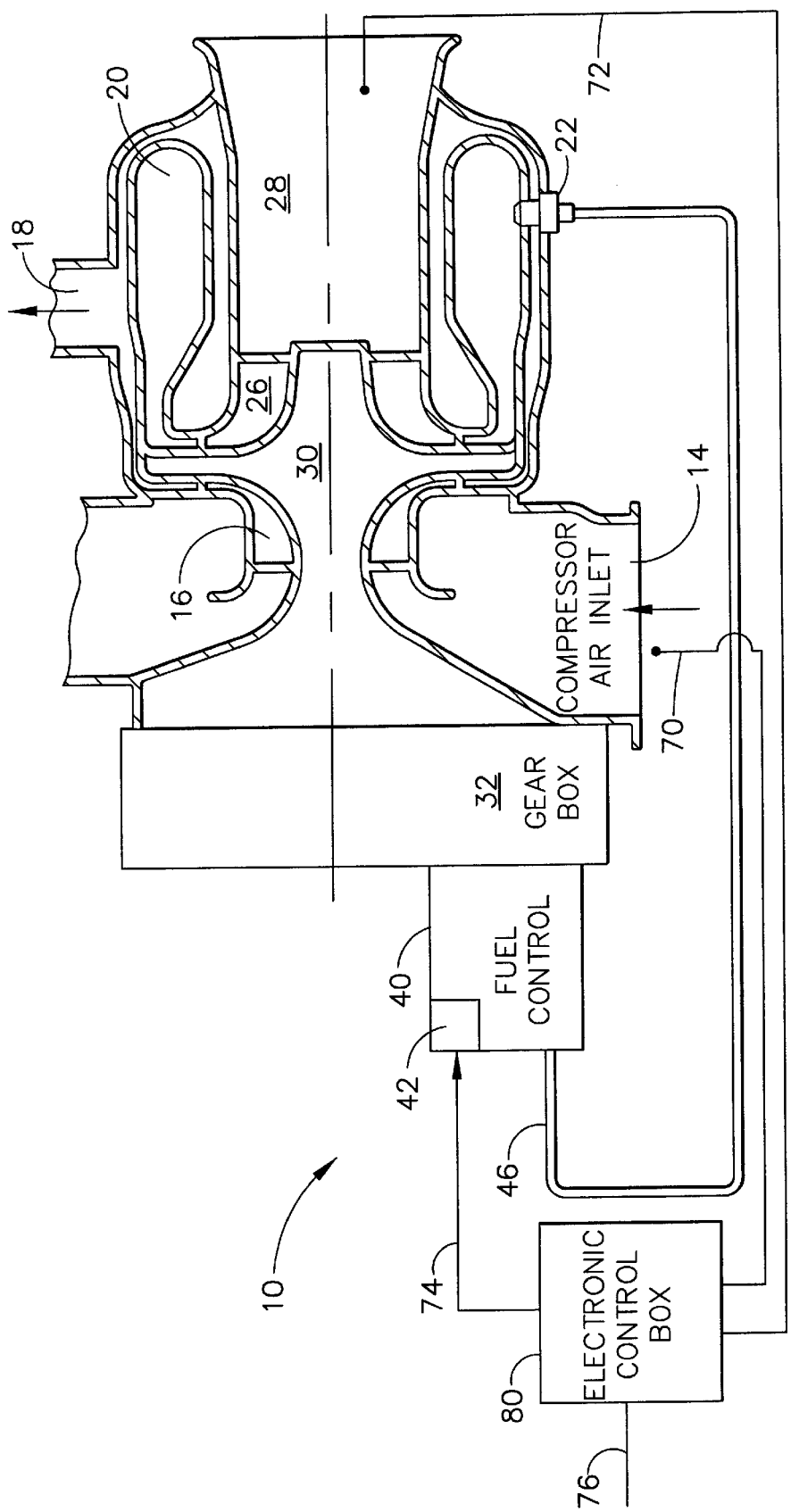
FIG. 1 is a schematic of an exemplary gas turbine engine in which a fuel control system embodying the principles of the present invention is incorporated.

Referring to FIG. 1, one form of gas turbine engine to which the present invention relates is generally denoted by reference numeral 10 and is referred to as an integral bleed engine. The engine 10 includes in flow series arrangement an air inlet 14, a compressor 16, a bleed port 18 for providing compressed air to the aircraft, a combustor 20 having a fuel nozzle 22, a turbine 26 and an exhaust 28. The compressor 16 and the turbine 26 are mounted on shaft 30, which is coupled to gearbox 32.

Drivingly mounted to the gearbox 32 is a fuel control unit 40 receiving pressurized gaseous fuel from a fuel tank not shown. Preferably, the fuel control unit 40 is a single stage, electromechanical fuel metering valve of the type well known to those skilled in the art. The fuel control unit 40 includes an electrically operated motor 42 which has a known and repeatable relationship with a command signal 74 from an electronic control unit (ECU) 80. The command signal 74 is generated from schedules in the ECU 80. An example of such a schedule can be found in Goff, et al. U.S. Pat. No. 5,274,996 which is incorporated herein by reference to the extent necessary to understand the invention. The motor 42 is directly coupled to the metering valve and controls the valve position so that a known flow area corresponds to a known command signal 74. The command signal 74 is preferably in milliamps and is referred to in the equations below as mA. The fuel control unit 40 discharges a metered fuel flow through a conduit 46 to the fuel nozzle 22.

The ECU 80, which may be analog or digital, governs the operation of the engine 10. The ECU 80 receives a T2 signal 70 from a thermocouple mounted in the inlet of the engine that measures the air temperature as it enters the engine. A thermocouple mounted in the exhaust 28 measures the exhaust gas temperature (EGT) and generates an EGT signal 72, which is also received by the ECU 80. A signal 76 is fuel pressure in the fuel source, Pt, and is also received by the ECU 80.

In the preferred embodiment, the ECU 80 includes a microprocessor programmed to perform the following functions. These functions can be programmed by anyone skilled in the programming art. Alternatively, the functions can be implemented by digital circuitry.

Figure 2:
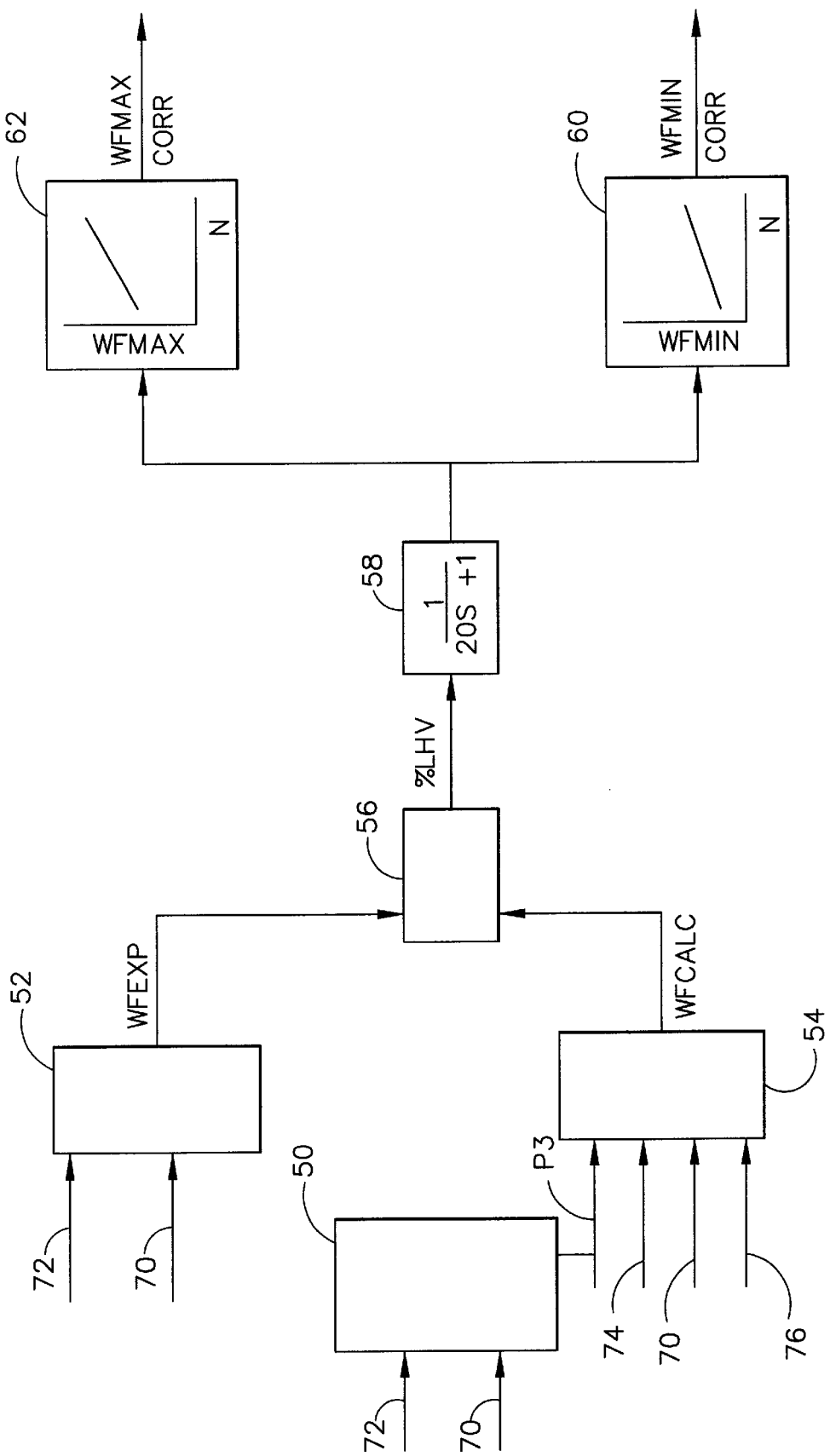
FIG. 2 is a block diagram of the variable fuel heating value adaptive control method contemplated by the present invention, which can be used in the fuel control system illustrated in FIG. 1.

Referring to FIG. 2, function block 52 receives the EGT and T2 signals 70 and 72. Within block 52 the following calculations are made. First a standard day correction factor THETA is calculated and then applied to the EGT measurement to arrive at a corrected EGT, EGTC2.

$$THETA = (T2+460)/519 \text{ and } EGTC2 = EGT/THETA$$

Then an expected fuel flow WFEXP is calculated.

$$WFEXP = k6*EGT - k7*T2^2 - k8*T2 - k9*EGT^2 - k10$$

If EGTC2 is greater than or equal to 720° F. then, in the preferred embodiment, k6=1.829, k7=0.00185, k8=1.3037, k9=0.00073, and k10=560.548. If EGTC2 is less than 720° F., then in the preferred embodiment, k6=1.6605, k7=0.0005315, k8=0.98433, k9=0.000811 and k10=421.06. The inventors have found through testing that the constants k in this equation change depending on whether or not EGTC2 is above or below 720° F. In alternate embodiments, this temperature point may be different or there may be more than one such temperature point. The calculated WFEXP is then divided by 3600 to convert to pounds per second, (pps).

Function block 50 receives the T2 and EGT signals, 70 and 72 and calculates the pressure in the combustor P3 by solving the following algorithm.

$$P3 = (k1*EGT) - (k2*T2^2) - (k3*T2) - (k4*EGT^2) + k5$$

Where P3 is in psia and EGT and T2 are in degrees Fahrenheit. In the preferred embodiment K1=0.1620, K2=0.001051, k3=0.23505, k4=0.00007067, and k5=72.24.

The algorithms and factors k1 through k10 in function blocks 50 and 52 are empirically determined for a given fuel type through the use of engine computer models and then validated through engine testing. In the preferred embodiment, this fuel type is natural gas with a power heating value (LHV) of 20,100 BTU/lb, which is referred to as the baseline fuel type. It should be appreciated that other fuels may be chosen as the baseline such as Jet A, JP1, JP2, JP3, JP4 or other fuels commonly used in gas turbine engines. Accordingly, WFEXP is indicative for the power level of the engine of the expected fuel flow if the fuel being burned is natural gas. The power level of the engine being directly related to measured EGT and T2. Alternatively, other measurements could be used. For example, instead of EGT, turbine inlet temperature, speed or pressure could be used in which case a new set of algorithms would need to be determined.

A number of constants are preset in function block 54. The specific heat ratio gamma is set at 1.33, which is gamma for natural gas. The gas constant R is set at 74. Prcrit, a critical pressure ratio is set at 0.5404 and is the pressure ratio across the metering valve below which the flow will be sonic. The fuel temperature upstream of the metering valve, Tc, is set at 100° F., alternatively it can be measured. The function block 54 also receives the calculated P3 as well as the T2 signal 70, the Pt signal 76 and the fuel command signal 74 from the ECU. The pressure at the fuel nozzle 22, PN, is calculated from the following.

$$PN = P3 + (570*WFLAST^2 - 1.08*WFLAST + 0.0095)$$

WFLAST is calculated later on in the routine. The pressure upstream of the metering valve Pc is calculated by subtracting 1.5 from Pt. A pressure ratio, Pr, across the metering valve is calculated by dividing Pn by Pc. If Pr is less that Prcrit, it is set to Prcrit and if Pr is greater than 1, it is set to 1. The latter is done to protect the system from an instrumentation failure that results in a Pr greater than 1. A metering valve area, A, is calculated by the following. If signal 74, (mA) is less than or equal to 10, then $$A = 0.004252*mA - 0.16845.$$

Otherwise, $$A = 0.009231*mA - 0.069566.$$

Using the compressible flow equation, function block 54 calculates an actual fuel flow WFCALC.

$$WFCALC = (A*PC/\sqrt{Tc+459.67})*\sqrt{((2*gamma*32.2)/((gamma-1)*R))*(Pr^{2/gamma} - Pr^{(gamma+1)/gamma})}).$$

WFLAST is set equal to WFCALC.

In function block 56, WFEXP is divided by WFCALC and this ratio is multiplied by the heating value for the baseline fuel type, natural gas, to arrive at a LHV scale factor % LHV. In the preferred embodiment, the lower heating value for natural gas is used. Alternatively, the higher heating value could be used. A dynamic filter 58 applies a conventional, twenty second, first order lag to % LHV. The final scale factor is then applied to each fuel schedule in the ECU 80. In the preferred embodiment, the ECU has a minimum fuel schedule as a function of engine speed, (N), 60 and a maximum fuel schedule as a function of engine speed 62. Each of these schedules is scaled or multiplied by the % LHV to arrive at maximum and minimum fuel flows corrected for variations in fuel composition. Other types of fuel schedules can also be scaled by the present invention.

The foregoing method is constantly being run so long as the engine is running. Thus, as the operating point of the engine changes resulting in a change in EGT, the scale factor is updated. Likewise, if the composition of the fuel changes, EGT will change and again the scale factor will be updated. Thus, a control and method is provided that continuously adjusts fuel sensitive schedules in the ECU for changes in the heating value of the fuel being combusted by the engine.

Various modifications and alterations to the above-described preferred embodiment will be apparent to those skilled in the art. For example, the present invention can be used with other gas turbine engine configurations. Accordingly, these descriptions of the invention should be considered exemplary and not as limiting the scope and spirit of the invention as set forth in the following claims.

What is claimed is:

1. A method for adjusting schedules in an electronic control unit for a gas turbine engine for variation in fuel type comprising the steps of:

calculating an expected fuel flow for a baseline fuel type as said engine is running;

calculating an actual fuel flow;

taking a ratio of said expected fuel flow to said actual fuel flow;

determining a fuel schedule scale factor by applying said ratio to the heating value of said baseline fuel type; and applying said scale factor to said schedules.

2. The method of claim 1 wherein said step of calculating actual fuel flow includes measuring temperatures in said engines.

3. The method of claim 2 wherein said measuring step includes measuring EGT and T2.

4. The method of claim 3 wherein said step of calculating the expected fuel flow includes the step of solving a predetermined equation using said measured temperatures.

5. The method of claim 4 wherein said predetermined equation is $$WFEXP = k6*EGT - k7*T2^2 - k8*T2 - k9*EGT^2 - k10.$$

6. The method of claim 5 further including the step of calculating an EGT corrected to standard day conditions.

7. The method of claim 6 wherein for a corrected EGT greater than or equal to a predetermine value then k6=1.829, k7=0.00185, k8=1.3037, k9=0.00073, and k10=560.548.

8. The method of claim 6 wherein for a corrected EGT less than said predetermined value then k6=1.6605, k7=0.0005315, k8=0.98433, k9=0.000811 and k10=421.06.

9. The method of claim 1 wherein said baseline fuel type is natural gas.

10. The method of claim 9 wherein said heating value is a lower heating value.

11. The method of claim 1 further including the step of applying a first order time lag to said scale factor before said scale factor is applied to said schedules.

12. The method of claim 1 wherein the step of calculating an expected fuel flow further comprises the step of calculating the pressure in the combustor of said engine.

13. The method of claim 12 wherein said step of calculating said combustor pressure includes measuring temperatures in said engines.

14. The method of claim 13 wherein said measuring step includes measuring EGT and T2.

15. The method of claim 14 wherein said step of calculating said combustor pressure includes the step of solving a predetermined equation using said measured temperatures.

16. The method of claim 15 wherein said predetermined equation is $$P3=(k1*EGT)-(k2*T2^2)-(k3*T2)-(k4*EGT^2)+k5.$$

17. The method of claim 16 wherein K1=0.1620, K2=0.001051, k3=0.23505, k4=0.00007067, and k5=72.24.

18. A variable fuel heating value adaptive control for a gas turbine engine comprising:

means for measuring at least one temperature in said engine as said engine is running;

means for calculating an expected fuel flow for a baseline fuel type using said temperature measurement;

means for calculating an actual fuel flow using said temperature measurement;

means for ratioing said expected fuel flow and said actual fuel flow;

means for deriving a scale factor from applying said ratio to the heating value of said baseline fuel type; and means for applying said scale factor to at least one fuel sensitive schedule in an electronic control unit of said engine.

19. A gas turbine engine comprising;

a compressor receiving ambient air;

a combustor receiving compressed air from said compressor and fuel from a fuel nozzle;

a turbine receiving combusted gas from said combustor and expelling said gas into an exhaust;

a shaft coupling said compressor and said turbine;

a gearbox coupled to said shaft;

a fuel control unit mounted to said gearbox for delivering metered fuel flow to said fuel nozzle;

at least one thermocouple mounted in said engine for measuring the temperature of said combusted gas an electronic control unit electronically coupled to said engine and said fuel control unit, said electronic control unit having at least one fuel sensitive control schedule and receiving a signal from said thermocouple;

said electronic control unit further comprising:

means for calculating an expected fuel flow for a baseline fuel type using said thermocouple signal;

means for calculating an actual fuel flow using said thermocouple signal;

means for ratioing said expected fuel flow and said actual fuel flow;

means for deriving a scale factor by applying said ratio to the heating value of said baseline fuel type; and means for applying said scale factor said fuel sensitive schedule.

* * * * *